United States Patent
Pereira Almao et al.

(10) Patent No.: US 11,203,724 B2
(45) Date of Patent: Dec. 21, 2021

(54) ULTRASONIC OXIDATIVE DESULFURIZATION OF HEAVY FUEL OILS

(71) Applicant: International Ultrasonic Technologies Inc., Carstairs (CA)

(72) Inventors: Pedro Pereira Almao, Calgary (CA); Carlos Eduardo Scott, Calgary (CA); Lante Antonio Carbognani, Calgary (CA)

(73) Assignee: International Ultrasonic Technologies Inc.

( * ) Notice: Subject to any disclaimer, the term of this patent is extended or adjusted under 35 U.S.C. 154(b) by 0 days.

(21) Appl. No.: 17/040,843

(22) PCT Filed: Mar. 22, 2019

(86) PCT No.: PCT/CA2019/050360
§ 371 (c)(1),
(2) Date: Sep. 23, 2020

(87) PCT Pub. No.: WO2019/178701
PCT Pub. Date: Sep. 26, 2019

(65) Prior Publication Data
US 2021/0002562 A1    Jan. 7, 2021

Related U.S. Application Data

(60) Provisional application No. 62/647,086, filed on Mar. 23, 2018.

(51) Int. Cl.
*C10G 67/12*       (2006.01)
*B01J 23/28*       (2006.01)
*B01J 23/30*       (2006.01)
*C10G 27/12*       (2006.01)
*C10G 27/14*       (2006.01)
*C10G 47/04*       (2006.01)
*C10G 45/04*       (2006.01)
*C10G 45/26*       (2006.01)

(52) U.S. Cl.
CPC .............. *C10G 67/12* (2013.01); *B01J 23/28* (2013.01); *B01J 23/30* (2013.01); *C10G 27/12* (2013.01); *C10G 27/14* (2013.01); *C10G 45/04* (2013.01); *C10G 45/26* (2013.01); *C10G 47/04* (2013.01); *C10G 2300/202* (2013.01); *C10G 2300/70* (2013.01)

(58) Field of Classification Search
CPC ........ C10G 27/04; C10G 27/12; C10G 27/14; C10G 45/04–08; C10G 45/26; C10G 67/12
See application file for complete search history.

(56) References Cited

U.S. PATENT DOCUMENTS 3,668,117 A * 6/1972 Patel ...................... C10G 67/12
                                                           208/228
4,203,828 A * 5/1980 Bodnick ................ C10G 45/26
                                                           208/213

(Continued)

*Primary Examiner* — Renee Robinson
(74) *Attorney, Agent, or Firm* — St. Onge Steward Johnston & Reens LLC

(57) ABSTRACT

The invention relates to systems and methods for ultrasonic oxidative desulfurization of heavy fuel oils. In various embodiments, the methods include combinations of ultrasonic sulfone decomposition processes and/or catalytic decomposition processes.

13 Claims, 3 Drawing Sheets

(56) References Cited

U.S. PATENT DOCUMENTS

| | | | | |
|---|---|---|---|---|
| 5,130,285 A | * | 7/1992 | Wang | B01J 23/882 |
| | | | | 502/309 |
| 5,200,060 A | * | 4/1993 | Sajkowski | B01J 27/22 |
| | | | | 208/108 |
| 6,402,939 B1 | * | 6/2002 | Yen | C10G 53/14 |
| | | | | 208/196 |
| 2004/0200759 A1 | | 10/2004 | Cullen | |
| 2009/0242459 A1 | * | 10/2009 | Soloveichik | C10G 21/003 |
| | | | | 208/213 |

* cited by examiner

ULTRASONIC OXIDATIVE DESULFURIZATION OF HEAVY FUEL OILS

FIELD OF THE INVENTION

The invention relates to systems and methods for ultrasonic oxidative desulfurization of heavy fuel oils. In various embodiments, the methods include combinations of ultrasonic sulfone decomposition processes and/or catalytic decomposition processes.

BACKGROUND OF THE INVENTION

In 2016, the International Maritime Organization (IMO) announced that new regulations were being implemented relating to sulfur content in maritime fuels, setting a global sulfur cap of 0.5% on marine fuels starting from Jan. 1, 2020.

At present, the current global sulfur cap on bunker fuel is much less stringent at 3.5 wt %. Within the shipping industry, a 3% reduction in sulfur content in marine fuels is a significant step change that will have a variety of knock-on effects throughout the global energy system. The specific costs of the IMO's regulatory change on the shipping industry are unknown at present, but there is widespread understanding that the effects will be large throughout many aspects of the fuel supply and delivery systems and infrastructure. That is, in addition to potentially impacting end-users like shipping companies with higher fuel costs, the IMO's decision will also impact refiners, crude producers and bunker suppliers. Importantly, the implementation of these regulations is being made to lessen the environmental effects of high-sulfur emissions and improve air quality at both the local and macroscopic scales.

As a result, the industry is working to figure out what processes may be both cost effective and reliable to create sufficient volumes of lower sulfur content fuel that will enable ships to operate while meeting the new standards.

For example, at present, various methodologies can be applied to a sulfur rich fuel oil to remove sulfur from the fuels. These methodologies include modifications to various hydrocracking and hydrotreating processes as a means to produce compliant fuels. However, when applied to heavy oil fractions, these processes require high pressures and temperatures together with high hydrogen consumption to create the fuel products having the low sulfur levels required, which may make these methodologies economically challenging. As a result, it has been discussed that creating fuels having 0.50 wt % sulfur will require some combination of the following four main approaches to achieve. In particular, capital costs of modifying existing refineries, new dedicated refineries and/or the location of refineries will all have an impact on the economics of producing and delivering the large volumes of fuel consumed by the shipping industry each year.

As discussed below, these four approaches each have its own advantages and drawbacks (Medium-Term Oil Market Report, February 2016) in terms of cost-effectiveness and process efficiency.

Approach 1-Secondary Crackers, Visbreakers and Cokers

Secondary units such as crackers, visbreakers and cokers may be added to refineries to enable upgrading from heavy fuel oil residues to gasoil grades. However, this approach requires substantial investment in the equipment and hence, if this investment is made it is likely to be made only in those refinery locations where the returns will be favorable which may result in patchy availability of the product fuels.

Approach 2-Change to a Sweeter Crude Slate

The use of a sweeter crude feedstock can provide lower sulfur fuels. Importantly, the downside of this approach is that such crude grades trade at higher differential which will have smaller refining margins. Moreover, demand by 2020 will be higher and thus likely result in a higher price for this product by 2020.

Approach 3-Residue Destruction

Residue destruction, stopping the production of fuel oil. This approach also requires large investments in capital equipment.

Approach 4-Desulfurization of Residual Fuel Oil

Desulfurization of residual fuel oil and blend with low sulfur gasoils. Similarly, this approach requires large investments in capital equipment. According to the International Energy Authority (IEA), these units are more expensive than upgrading units, and presently there is little demand for fuel oil desulfurization units, with global capacity estimated to be less than 0.1 mb/d.

Further still, another option that has been discussed and studied and that does involve the creation of higher value fuels is the installation of scrubbers on board the ships and continuing to use High Sulfur Fuel Oils (HSFO). Scrubbers connected to the exhaust systems on ships that directly clean the exhaust by the removal of sulfur from the exhaust are permitted under the IMO rules. However, these systems have related technical and environmental challenges, since wash-waters of scrubbers (each of open, hybrid or closed loop systems) are highly acidic and corrosive and hence, will provide other challenges including the handling and disposal of the wash-waters and maintenance of the scrubbers.

In particular, open-loop scrubbers discharge to the sea and, as a result, could cause significant damage to the marine ecosystem depending on location. Hybrid scrubbers that have closed loop for operations in ports and that do not allow direct discharge of wash-waste into the waters would require port authorities to install facilities to capture the discharged waste from scrubbers and to dispose them without causing further damage to the environment. Moreover, monitoring and enforcement of the operation of such systems would be costly and challenging.

While it is understood nowadays that industrially hydrotreated light petroleum fuels will generally have fewer sulfur-containing compounds than in past years, it is also known that techniques effective for treating light fuel oils are not necessarily effective in removing sulfur from heavy fuel oils. That is, currently used processes including hydrodesulfurization (HDS) enable the removal of compounds such as sulfides, thiols and thiophenes from lighter fuels. However, other compounds including substituted condensed benzo-naphtha-thiophenes are the common sulfur compounds but they are also the most difficult and costly to remove by HDS in either light or heavy fuels.

As a result, since the 1990s, alternative oxidative paths for desulfurization, called Oxidative De-Sulfurization (ODS) have been explored. FIG. 1 shows three options using oxygen transfer to form sulfones, as an alternative of hydrotreating to eliminate sulfur.

One particular technique that has been effective on some fuels has been the use of ultrasonication as part of the oxidative process. Importantly, oxidation of the sulfur compounds to sulfones requires moderate temperatures and performing it directly on the hydrocarbons fuel matrix may generate oxidation of non-sulfur containing molecules, causing significant loses of the oxidant agent. As such, the use of ultrasonication to accelerate mass and heat transfer making the sulfur reactions selectively targeted was also proposed in the 1990s and reached demonstration levels in the last decade.

Importantly, ultrasonically assisted oxidative deep desulfurization processes have been shown to be effective in eliminating sulfur compounds difficult to hydro-desulfide in light petroleum fuels, thus meeting the today's stringent environmental regulations for ultra-low sulfur gasoline and diesel (10 ppm sulfur) specifications at significantly lower cost than HDS.

One technique using ordinary (non-ultrasonic) ODS can use hydrogen peroxide as an oxidant agent with subsequent dissolution of the sulfones formed in water is effective to perform a deep desulfurization to reduce the amount of organosulfur compounds in fuel oils to less than 10 ppm in sulfur. However, the insolubility of the polar aqueous phase and the nonpolar organic phase is a significant problem in the process of oxidative desulfurization as both phases react with each other only at the interphase. That is, without ultrasonication, ODS has low reaction rates and a slow conversion of organosulfur compounds.

Thus, while the prior art teaches various techniques for removing sulfur from lighter fuels, there remains a need for techniques that are effective in heavier fuels.

SUMMARY OF THE INVENTION

In accordance with the invention, there is provided a method for desulfurization of a heavy fuel oil containing sulfur comprising the steps of:

a) subjecting a heavy oil fuel to an ultrasonic oxidation process in the presence of an aqueous oxidizing agent to form a sulfone rich effluent;

b) subjecting the sulfone rich effluent to one or more of:
  i) a hydro catalytic sulfones decomposition process (HDP), or
  ii) a steam catalytic sulfone decomposition process (SDP) to form a desulfurized heavy oil fuel.

In various embodiments, step b) i) includes processing the sulfone rich effluent through a hydro catalytic reactor having a reducing/desulfonating hydrogenating catalyst selected from: $Mo_2C$, $MO_zO_xC_y$, $MO_zO_nC_m$No.

In other embodiments, step b) i) includes processing the sulfone rich effluent through a hydro catalytic reactor having an oxidizing/desulfonating hydroprocessing catalyst selected from metallic carbides, oxy-carbides and nitrides and mixtures of thereof.

In other embodiments, step b) i) includes processing the sulfone rich effluent through a hydro catalytic reactor having an oxidizing/desulfonating hydroprocessing catalyst selected from molybdenum and tungsten and mixtures thereof.

In further embodiments, step b) i) includes processing the sulfone rich effluent through a hydro catalytic reactor having an oxidizing/desulfonating hydroprocessing catalyst selected from bi-, tri-, tetra or penta-metallic oxides combinations having elements from groups 1 and 2 including Na, K, Cs, Ca, Mg or Ba; elements from groups 4, 5, 6 7, 8, 9, 10, 11 including Ti, V, Cr, Mn, Fe, Co, Ni, Cu, Mo, Zr or Ce and elements from groups 13, 14, 15 including Al, Si, P which maybe impregnated with noble metals including Pd and Pt or metallic carbides.

In still further embodiments, step b) ii) includes processing the sulfone rich effluent through a steam processing catalytic reactor having an oxidizing/desulfonating hydroprocessing catalyst selected from any one of or a combination of:

NiCe-Hydrotalice: Mixed oxides MgO.NiO.CeO2.Ce2O3. Al2O3;
Mn-Hydrotalcite: Mixed oxides MgO.Mn2O3.MnO.Al2O3;
Cu-Hydrotalcite: Mixed oxides MgO.CuO.Cu2O.Al2O3;
V-Hydrotalcite: Mixed oxides MgO.V2O3.V2O5.Al2O3;
CaCu-silicates: Mixed oxides CaO.CuO.Cu2O.SiO2;
BaCu-silicates: Mixed oxides BaO.CuO.Cu2O.SiO2;
BiMo-oxides: Mixed oxides Bi2Mo3O12;
K2O/Hydrotalcite: Mixed oxides K2O.MgO.Mn2O3.MnO.Al2O3;
K2O/NiCe-Hydrotalice: Mixed oxides K2O.MgO.NiO.CeO2.Ce2O3. Al2O3;
KCe-Zirconia: Mixed oxides K2O.CeO2.Ce2O3. ZrO2; and,
BaCe-Zirconia: Mixed oxides BaO.CeO2.Ce2O3.ZrO2.

In further embodiments, the catalyst includes a solid support selected from any one of or a combination of alumina, silica and modified kaolin with controlled textural properties.

In further embodiments, the catalyst has a surface area in the range between 40 and 80 square meters/g.

In further embodiments, the catalyst has a porosity in the range of 6-50 nm.

In other embodiments, the oxidizing agent is any one of or a combination of hydrogen peroxide, ozone, organic peroxides or peroxy acids.

In further embodiments, step a) includes addition of an oxidizing catalyst.

In further embodiments, the oxidizing catalyst is selected from formic acid or acetic acid.

In still further embodiments, step a) includes the addition of a diluent.

In further embodiments, the sulfone rich effluent of step a) is subjected to aqueous phase removal to recover oxidizing catalyst, water and diluent, if present.

In other embodiments, the feed for step b) ii) is a water free effluent from step a).

In further embodiments, the feed for step b) ii) is a water/oil effluent from step a) and where after the HDP or the SDP, a sulfone free effluent is subjected to a high temperature separation process to form the desulfurized oil and a vapor stream containing any one of or a combination of sulfur containing gases, steam and light hydrocarbons.

In further embodiments, steps a) and b) are controlled to form a desulfurized heavy oil fuel having a sulfur content less that 0.5% (by weight).

In further embodiments, the heavy fuel oil has a sulfur content greater than 0.5 (by weight) and steps a) and b) are controlled to form a desulfurized heavy oil fuel having a sulfur content less that 0.5% (by weight).

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION OF THE INVENTION

Introduction

With reference to the figures, systems and methods for ultrasonic desulfurization of heavy fuel oils are described.

Figure 1:
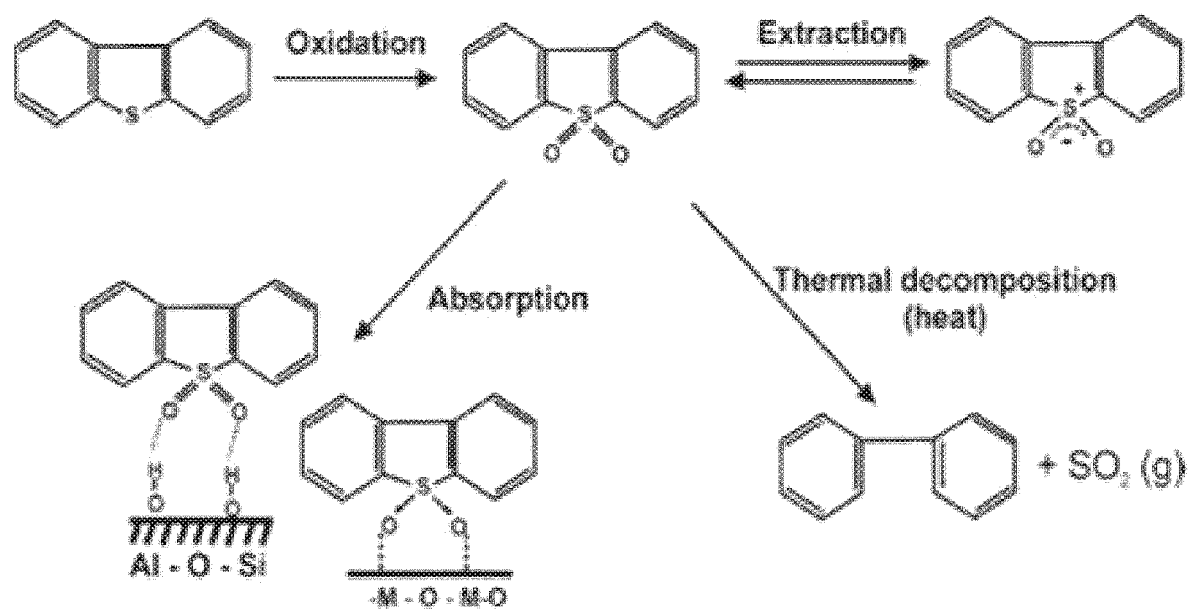
FIG. 1 shows a process schematic of oxidative desulfurization (ODS) of Dibenzo-thiophene (DBT) via extraction, decomposition and adsorption.
Figure 2:
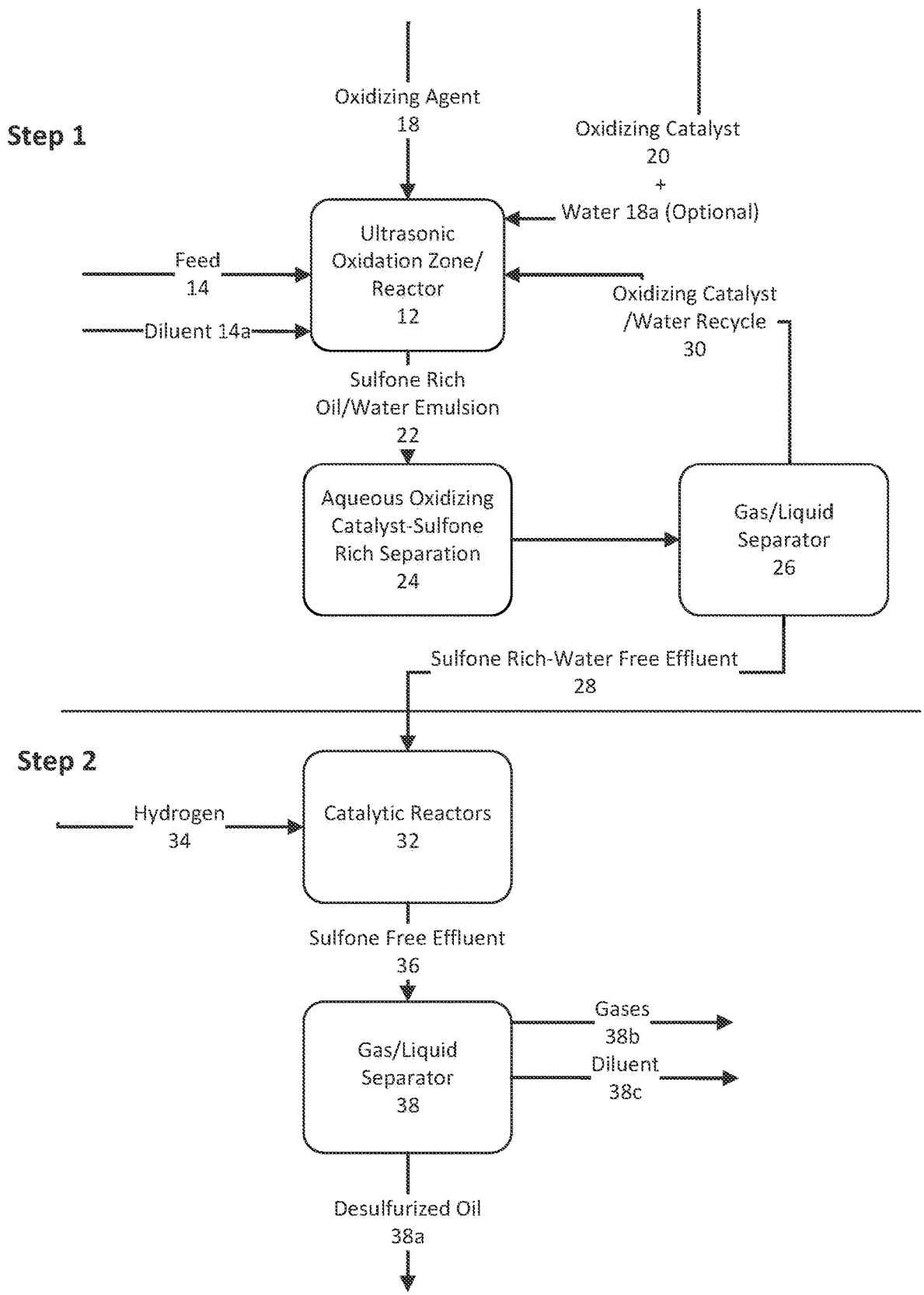
FIG. 2 is a schematic flow diagram and reactor sequence for a desulfurization of heavy fuel oils in accordance with a 1st embodiment of the invention.
Figure 3:
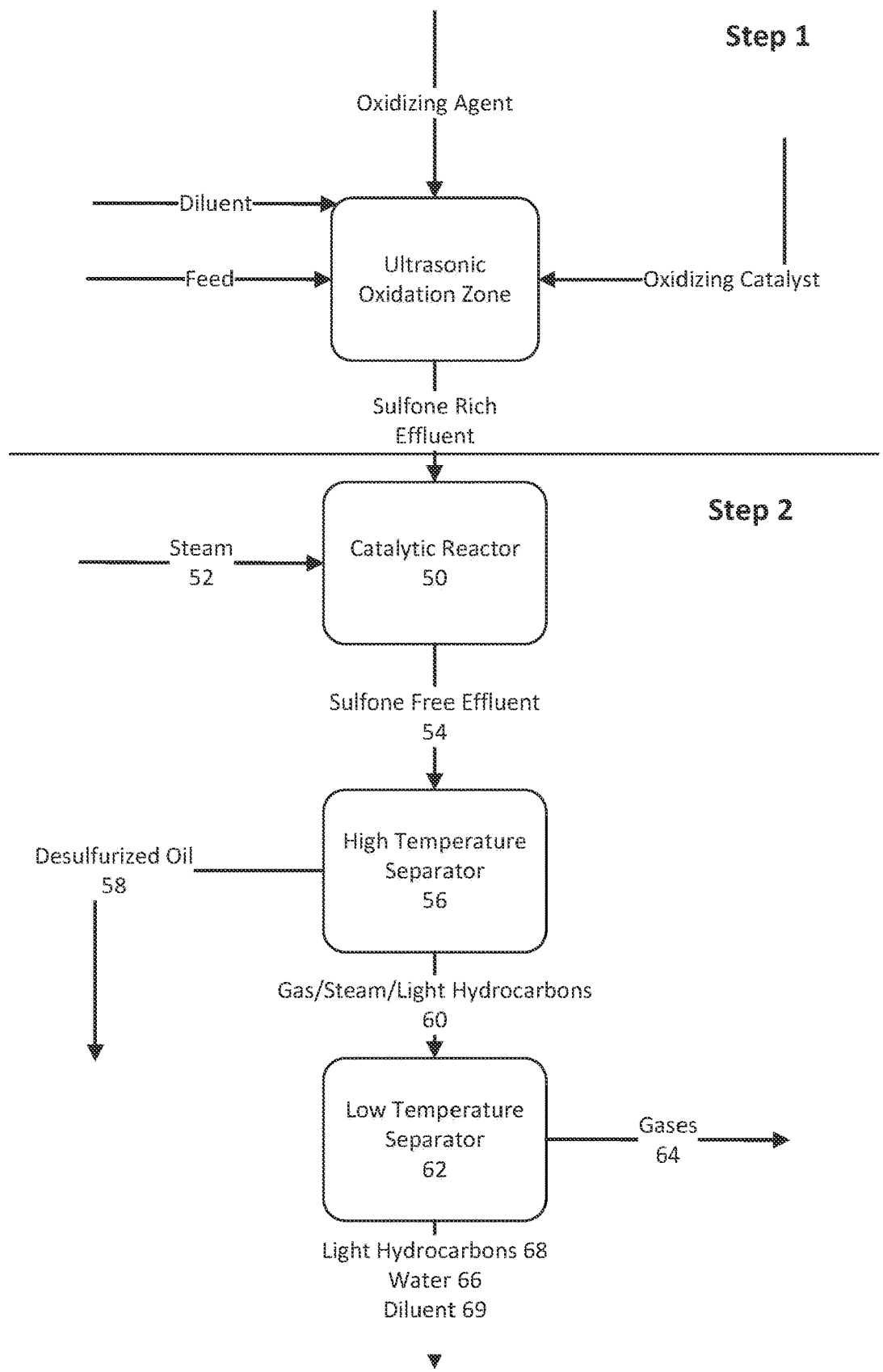
FIG. 3 is a schematic flow diagram and reactor sequence for a desulfurization of heavy fuel oils in accordance with a 2nd embodiment of the invention.

Systems and methods of catalytic oxidative desulfurization (CODS) of heavy fuel oils can generally be carried out in two main steps including Step 1, an ultrasonic desulfurization step followed by Step 2, different decomposition steps which can include catalytic hydro decomposition (HDP) (FIG. 2) or catalytic steam decomposition (SDP) (FIG. 3).

Step 1-Ultrasonic Desulfurization

Generally, Step 1 is conducted within an ultrasonic oxidation reactor/zone 12. A heavy oil feed 14 (with optional diluent 14a) is introduced into an US reactor/zone 12 in the presence of an oxidizing agent 18 and preferably an oxidizing catalyst 20 together with additional water 18a. Suitable oxidizing agents include hydrogen peroxide, ozone, organic peroxides or peroxy acids. The oxidizing agents will preferably be concentrated typically in the range of 30-50% concentration in water and be introduced at roughly 50% by volume relative to the feed volume. Additional water 18a be introduced as an aqueous phase to create an aqueous phase volume and, hence additional emulsion surface area. A volume of a strong oxidizing catalyst 20 is preferably added (typically about 85% concentration and 50% volume relative to undiluted the oxidizing catalyst). Suitable oxidizing catalysts include formic acid and acetic acid.

Within the ultrasonic oxidation zone 12, varying degrees of ultrasonic energy are applied sufficient to create a microemulsion of oil and aqueous phase. The sulfones will predominantly remain within the oil phase. More specifically, the sulfur atoms (typically in the divalent state) on the organic molecules are oxidized by the addition of oxygen atoms to form preferentially sulfones (hexavalent state of sulfur).

Depending on the resulting viscosity of the emulsion, additional diluent 14a may be introduced to enable the mixture to be pumped and/or handled. Suitable diluents include aromatics such as toluene.

As shown in FIG. 2, after reaction emulsion 22 may be separated in appropriate liquid/liquid 24 and/or gas/liquid 26 separators to form a sulfone-rich water free effluent 28.

Oxidizing catalyst and water may be recycled 30.

Step 2-Catalytic Sulfone Hydro-Decomposition

After forming the sulfone-rich effluent 28, the sulfone rich effluent 28 is reacted with a suitable solid catalyst within a catalytic reactor 32 and hydrogen 34 enable catalytic desulfurization of the sulfones. Under suitable conditions and in the presence of the catalyst, a sulfone free effluent 36 is formed in which the sulfones are partially or totally decomposed forming preferentially SO2 and/or $H_2S$ molecules.

As shown in FIG. 2, subsequent to catalytic reaction, the sulfone free effluent 36 is subjected to gas/liquid separation 38 resulting in desulfurized oil 38a and sulfur dioxide/hydrogen sulfide gas. Gases 38b and/or diluent 38c can be recovered by various techniques including adsorption or liquefaction.

FIG. 3 shows an alternate embodiment utilizing catalytic steam decomposition. As shown, if the catalytic reactor 50 utilizes steam 52 to form a sulfone free effluent 54, the sulfone free effluent may utilize a high temperature separator/process 56 to form the desulfurized oil 58 and a vapor stream 60 containing any one of or a combination of sulfur containing gases, steam and light hydrocarbons. These gases may be subjected to a subsequent low temperature separation process 62 to effect separation of sulfur dioxide containing gases 64 and water 66 light hydrocarbons 68 and diluent 69.

If the process uses catalytic steam decomposition process, step 1 of FIG. 3 does not require steps to remove the aqueous phase.

In each case, the process steps are preferably controlled to form a desulfurized heavy oil fuel having a sulfur content less that 0.5% (by mass).

Catalytic Formulations

The oxidizing/desulfonating hydroprocessing catalyst and the bifunctional steam processing catalysts can be selected from:

Metallic carbides, oxy-carbides and nitrides and mixtures of thereof of.

Molybdenum and tungsten for the hydro processing catalysts.

Bi-, tri-, tetra or penta-metallic oxides combinations having elements from the groups 1 and 2 including Na, K, Cs, Ca, Mg or Ba; elements from the groups 4, 5, 6, 7, 8, 9, 10, 11 including Ti, V, Cr, Mn, Fe, Co, Ni, Cu, Mo, Zr or Ce and elements from groups 13, 14, 15 including Al, Si, P which maybe impregnated with noble metals including Pd and Pt or metallic carbides including those of molybdenum and tungsten for the steam processing catalysts.

Examples of steam processing catalysts include:

NiCe Hydrotalcite: Mixed oxides $MgO.NiO.CeO_2.Ce_2O_3. Al_2O_3$.

Mn-Hydrotalcite: Mixed oxides $MgO.Mn_2O_3.MnO.Al_2O_3$.

Cu-Hydrotalcite: Mixed oxides $MgO.CuO.Cu_2O.Al_2O_3$.

V-Hydrotalcite: Mixed oxides $MgO.V_2O_3.V_2O_5.Al_2O_3$.

CaCu-silicates: Mixed oxides $CaO.CuO.Cu_2O.SiO_2$.

BaCu-silicates: Mixed oxides $BaO.CuO.Cu_2O.SiO_2$.

BiMo-oxides: Mixed oxides $Bi_2Mo_3O_{12}$.

$K_2O$/Hydrotalcite: Mixed oxides $K_2O.MgO.Mn_2O_3.MnO.Al_2O_3$.

$K_2O$/NiCe Hydrotalcite: Mixed oxides $K_2O.MgO.NiO.CeO_2.Ce_2O_3. Al_2O_3$.

KCe-Zirconia: Mixed oxides $K_2O.CeO_2.Ce_2O_3. ZrO_2$.

BaCe-Zirconia: Mixed oxides $BaO.CeO_2.Ce_2O_3. ZrO_2$.

Another set of catalysts for this process, including those for hydroprocessing, can be prepared with the same suite of active components described above, using solid supports such as alumina and silica and modified kaolin with controlled textural properties (surface area and porosity are preferably in the range between 40 and 80 square meters/g and 10-50 nm, respectively). The dispersion is enhanced by slight acidification of the solid support and successive or co-impregnation with precursor solutions of the same active metals followed by drying and calcination to form the corresponding metal oxides containing catalysts. These catalysts will generally have similar performance, reduced costs and a lower environmental impact in terms of generation of metal contaminated aqueous effluents than the above described, therefore constituting a possible and more desirable path.

Discussion and Examples

The binding energy of the sulfone bonds O=S=O compared to the thio bonds C—S—C bonds is significantly higher as it may be derived from photoelectron spectroscopy (~4 ev). This implies that the C—S bonds when that sulfur is previously converted into sulfones is weakened, which means that, under appropriate conditions of either mild hydrogenation or mild oxidation, S in hydrocarbons either as sulphide or thiophenic forms is less reactive than in C-(sulfone)-C.

Therefore, in terms of removing S from hydrocarbons, having a pre-oxidation step of the sulfur present in petroleum fractions leading to sulfones will facilitate the extraction via rupture of the C-(sulfone) bonds with respect to the direct C—S bonds breaking, especially when sulfur is in the most abundant thiophenic form.

The $SO_2$ evolving from decomposition of sulfones is also more stable than the $H_2S$ product resulting from the direct hydro treatment or steam treatment.

Applicant has shown that hydro and steam treatment after the sulfones have been formed via the Ultra Sound Assisted-Oxidation path is significantly easier (lower T requirements) or faster (higher reaction rate).

Laboratory tests were carried out in continuous units, on Heavy Fuel Oil as indicated in Tables 1 and 2. Table 1 compares the results of hydrodesulfurization of a high sulfur fuel oil (HFSO) containing 3.22 wt % sulfur (Row 1) via standard hydrodesulfurization (HDS) (Experiment 1) and ultrasonic oxidation followed by catalytic hydrodesulfurization (Experiment 2) in accordance with the invention. As shown, Experiment 2 shows that a HSFO feed can produce a product having less than 0.5 wt % sulfur.

TABLE 1

Hydrodesulfurization

| | Feed/Product | Sulfur content (wt %) | Viscosity @ 25 C. | Micro-Carbon (wt %) | H/C ratio |
|---|---|---|---|---|---|
| Feed | HSFO | 3.22 | 85090 | 7.69 | 1.0 |
| Experiment 1 | HDS Product | 0.92 | 1304 | 3.36 | 1.32 |
| Experiment 2 | HDS Product via ultrasonication and HDP | 0.45 | 942 | 3.25 | 1.26 |

The conditions for the hydrodesulfurization reactors for experiments 1 and 2:

continuous flow reactor setup

P=1400 PSI

T=345° C.

WHSV (weight hourly space velocity)=0.2 h$^{-1}$

Vol. ratio $H_2$/Oil=1150

Catalyst: 21% molybdenum carbide-nitride-oxi-carbide (21 wt %)/$Al_2O_3$ (79 wt %)

Table 2 compares the results of steam processing of a high sulfur fuel oil (HFSO) containing 3.22 wt % sulfur (Row 1) via standard steam processing (Experiment 3) and ultrasonic oxidation followed by catalytic steam processing (Experiment 4) in accordance with the invention. Experiment 3 was not stable and Experiment 4 shows that a HSFO feed can produce a product having less than 0.5 wt % sulfur when subjected to a combined ultrasonication and catalytic steam processing process.

TABLE 2

Steam Processing

| | Feed/Product | Sulfur content | Viscosity @ 50 C. | Micro-Carbon (% w) | H/C ratio |
|---|---|---|---|---|---|
| 1 Experiment 3 | HSFO Feed Steam processing | 0.95 | 1324 Reactor not stable | 15.57 | NA |
| Experiment 4 | Steam processing post ultrasonication sulfonation | 0.50 | 363 | 14.28 | NA |

The conditions for all steam processing experiments:

continuous reactor setup

P=400 PSI

T=370° C.

WHSV=0.25 h$^{-1}$

Steam/oil ratio=0.05 wt %.

Catalyst Ni(7 wt %)/Ce(14 wt %)/Mg(8 wt %)/Al oxides (rest)

Thus, these examples illustrate that the ultrasonic oxidation with a strong oxidizing agent as described facilitates the decomposition of the sulfones as compared to the same catalytic process without pre-oxidation forming sulfones via hydroprocessing and steam processing processes.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method for desulfurization of a heavy fuel oil containing sulfur comprising the steps of:
   a) subjecting a heavy fuel oil to an ultrasonic oxidation process in the presence of an aqueous oxidizing agent to form a sulfone rich effluent; and
   b) subjecting the sulfone rich effluent to
   a steam catalytic sulfone decomposition process (SDP) to form a desulfurized heavy fuel oil and where the SDP process includes processing the sulfone rich effluent through a steam processing catalytic reactor having an oxidizing/desulfonating hydroprocessing (ODH) catalyst selected from any one or a combination of mixed oxides of Ni—Ce hydrotalcite, Mn hydrotalcite, Cu-hydrotalcite, V-hydrotalcite, CaCu-silicates, Ba—Cu-silicates, BiMo-oxides, $K_2O$/hydrotalcite, $K_2O$/Ni—Ce hydrotalcite, KCe-Zirconia and BaCe-Zirconia.

2. The method as in claim 1 where the ODH catalyst includes a solid support selected from any one of or a combination of alumina, silica and modified kaolin with controlled textural properties.

3. The method as in claim 2 where the ODH catalyst has a porosity in the range of 6-50 nm.

4. The method as in claim 1 where the ODH catalyst has a surface area in the range between 40 and 80 square meters/g.

5. The method as in claim 1 where the oxidizing agent is any one of or a combination of hydrogen peroxide, ozone, organic peroxides or peroxy acids.

6. The method as in claim 1 where step a) includes addition of an oxidizing catalyst.

7. The method as in claim 6 the oxidizing catalyst is selected from formic acid or acetic acid.

8. The method as in claim 1 where step a) includes the addition of a diluent.

9. The method as in claim 1 where the sulfone rich effluent of step a) is subjected to aqueous phase removal to recover oxidizing catalyst, water and diluent, if present.

10. The method as in claim 1 where a feed for the SDP is a water free effluent from step a).

11. The method as in claim 1 where a feed for the SDP is a water/oil effluent from step a) and where after the SDP, a sulfone free effluent is subjected to a temperature separation process to form the desulfurized oil and a vapor stream containing any one of or a combination of sulfur containing gases, steam and light hydrocarbons.

12. The method as in claim 1 where steps a) and b) are controlled to form a desulfurized heavy fuel oil having a sulfur content less that 0.5% (by weight).

13. The method as in claim 1 where the heavy fuel oil has a sulfur content greater than 0.5% (by weight) and steps a) and b) are controlled to form a desulfurized heavy fuel oil having a sulfur content less that 0.5% (by weight).

* * * * *